L. CONNER & W. COLBERT.
MACHINE FOR CUTTING DOWN TREES.
APPLICATION FILED APR. 3, 1915.

1,182,976.

Patented May 16, 1916.
2 SHEETS—SHEET 1.

Witnesses
F. C. Caswell
A. M. Ruge

Inventors
Lox Conner
Wilson Colbert
by John E. Styken, Atty.

L. CONNER & W. COLBERT.
MACHINE FOR CUTTING DOWN TREES.
APPLICATION FILED APR. 3, 1915.
1,182,976.
Patented May 16, 1916.
2 SHEETS—SHEET 2.
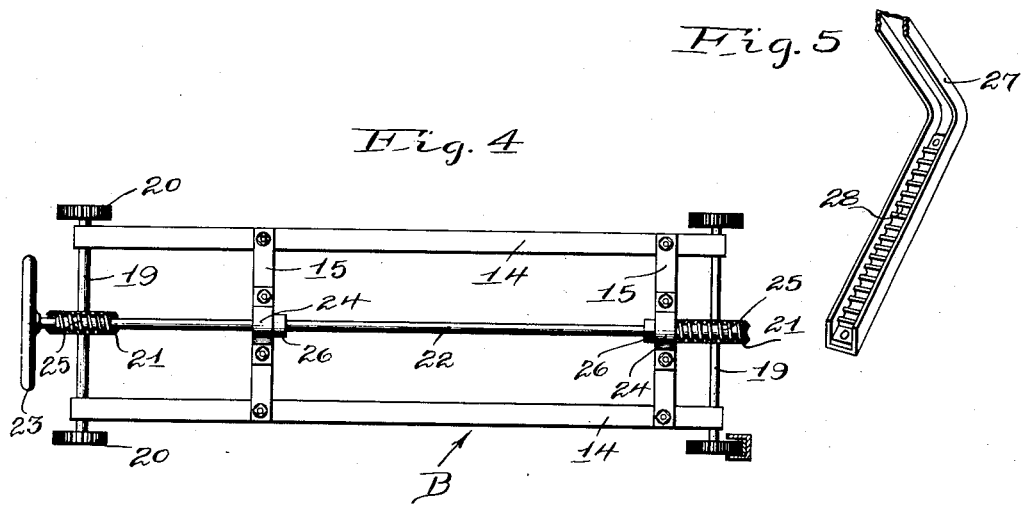
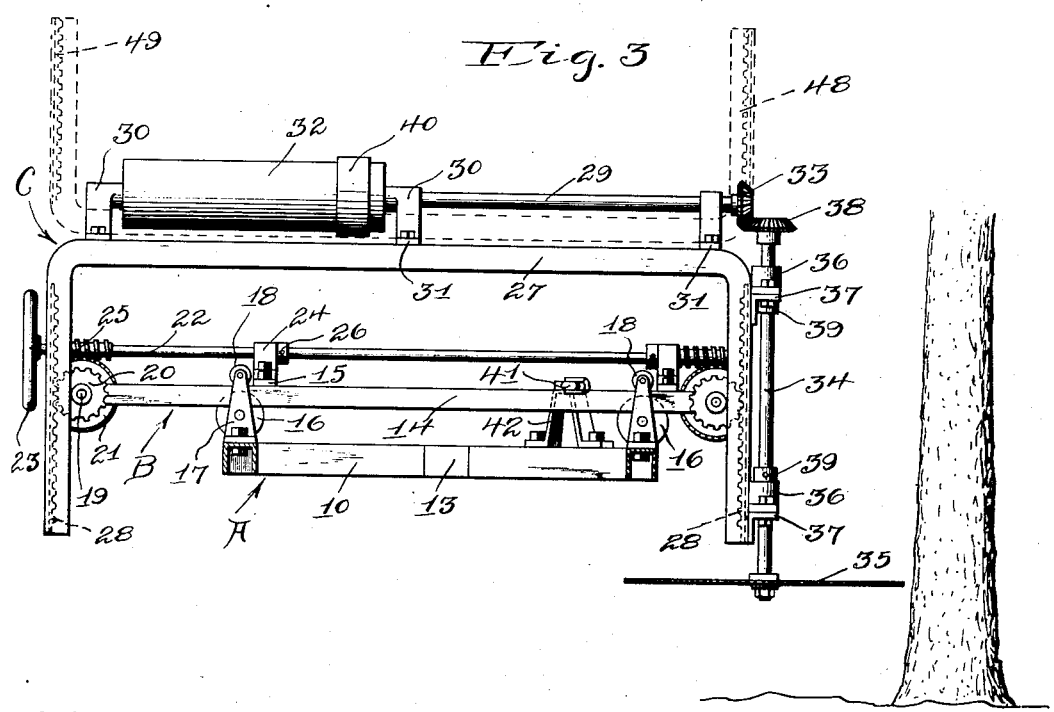
Witnesses
H. C. Caswell
A. M. Ruge
Inventors
Lox Conner
Wilson Colbert
by John E. Stryker atty.

UNITED STATES PATENT OFFICE.

LOX CONNER AND WILSON COLBERT, OF DEDHAM, IOWA.

MACHINE FOR CUTTING DOWN TREES.

1,182,976.  Specification of Letters Patent.  Patented May 16, 1916.

Application filed April 3, 1915. Serial No. 18,919.

*To all whom it may concern:*

Be it known that we, Lox CONNER and WILSON COLBERT, citizens of the United States, residing at Dedham, in Carroll county, in the State of Iowa, have invented new and useful Improvements in Machines for Cutting Down Trees, of which the following is a specification.

Our invention relates to improvements in sawing machines for cutting down trees. Its object is to provide a simple and durable device of this kind furnished with a power-driven saw-blade and means for adjusting said blade vertically and shifting the same horizontally.

Our invention also includes various novel features of construction, which are hereinafter particularly described and pointed out in the claim.

Figure 1:
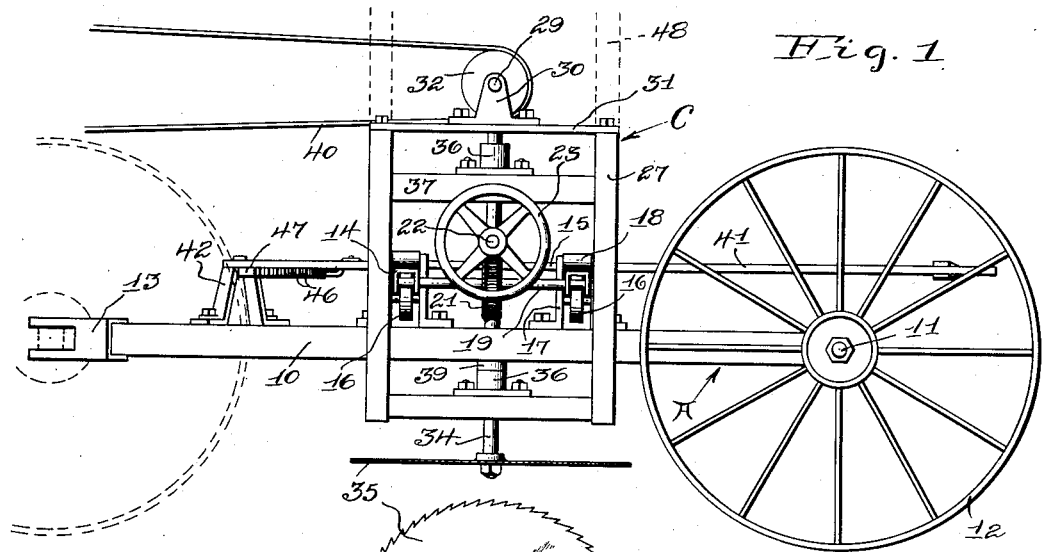
Figure 2:
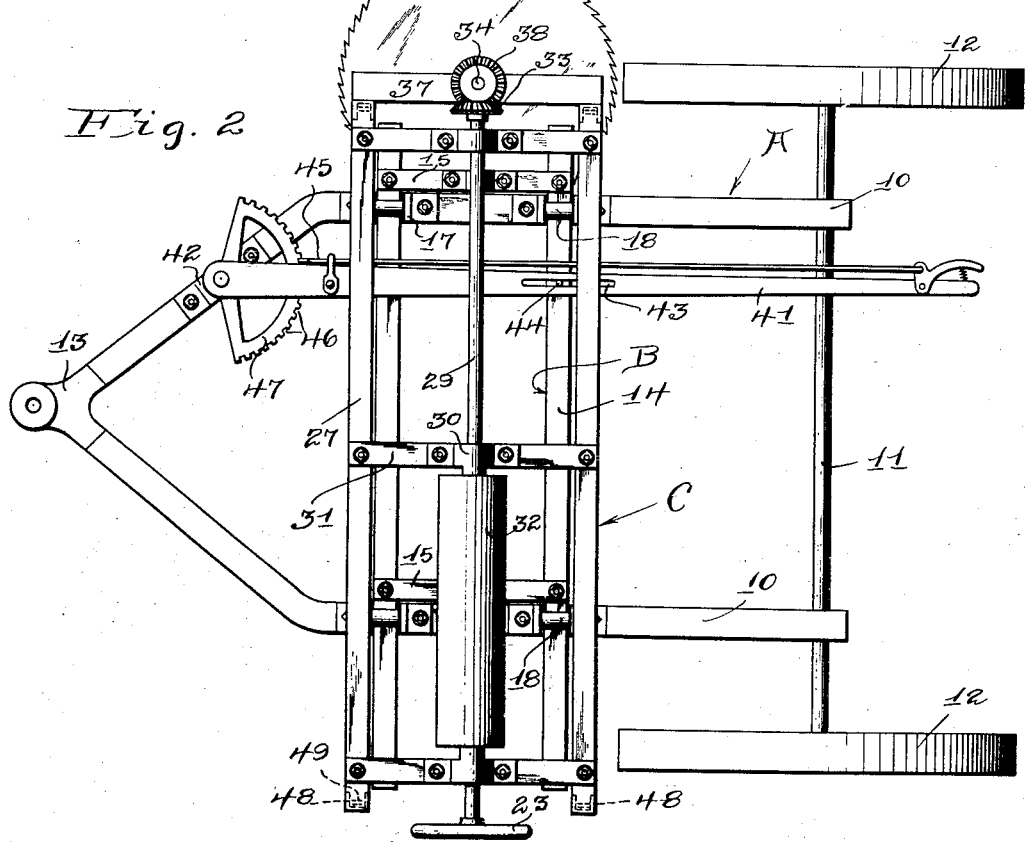

In the drawings, Figure 1 is a side elevation illustrating in solid lines a machine embodying our invention and in dotted lines the rear wheel and axle of an ordinary vehicle (carrying a source of power), to which said machine is attached; Fig. 2 is a plan view of the machine, Fig. 3 is an end elevation thereof, the rear end of the frame being broken away to more clearly illustrate the device, Fig. 4 is a detail plan view of the carriage and Fig. 5 is a fragmentary perspective view of the vertically adjustable saw-supporting frame on said carriage.

Our invention consists primarily of a truck, a carriage slidable transversely on said truck and a vertically adjustable saw-supporting frame on the carriage. Said carriage is designed to be moved upon the truck to shift the saw toward and away from a tree, and the frame is arranged to be adjusted vertically upon said carriage to vary the height of the cut.

Referring to the accompanying drawings, we have used the reference letter A to indicate the truck, B the carriage and C the supporting frame.

The truck A is of the trailer type and includes a pair of channeled beams 10 resting at their rear ends on an axle 11, upon which supporting wheels 12 are journaled. Said beams extend forward from said axle in parallel relation with respect to each other, then converge and are joined by a coupling 13, adapted to be pivotally mounted upon the rear axle of another vehicle.

The carriage B is made up of a pair of channel bars 14 secured parallel to each other by cross pieces 15 and is slidable transversely upon the truck A. The mounting for said carriage is formed by two rollers 16 for each bar 14, said rollers being revoluble in bearings 17 upon the beams 10 of the truck A and adapted to roll in the ways formed between the depending flanges of said bars. Keepers 18 are supplied to secure the carriage B from tilting upon said rollers 16. For this purpose we prefer to use small rollers, revoluble in the bearings 17, adapted to bear against the upper surfaces of said bars 14. Shafts 19 are journaled transversely in the ends of the bars 14, and each shaft carries a spur gear 20 at each end thereof, and a worm wheel 21 between said spur gears. The shaft 22 having a hand-wheel 23 thereon is journaled longitudinally with respect to the carriage B in bearings 24 on the cross pieces 15. This shaft carries two worms 25, one being in mesh with the worm wheel 21 at one end of the carriage B and the other in mesh with the worm wheel 21 at the opposite end of the carriage. Said shaft 22 is secured against longitudinal movements in its bearings 24 by collars 26 attached to the shaft and abutting against opposite sides of said bearings.

The saw-supporting frame C consists of two inverted U-shaped channel bars 27. Within the channel of each leg of said U-shaped bars a rack 28 is secured (see Fig. 5). One of the spur gears 20 on the carriage B meshes with each rack 28 and the flanges of the bars 27 embrace the sides of the gears 20, thus retaining said gears in mesh with the racks 28. Manipulation of the hand-wheel 23 operates through the worms 25 and worm-wheels 21 to turn the gears 20 and raise and lower the frame C. It will be noted that the arrangement described provides for the accurate vertical adjustment of the saw-blade. Such accurate adjustment is often necessary, for example, in cutting down a large tree where it is required to make several kerfs in the same plane before the trunk is severed. The spur gears 20 support the frame C at each corner thereof and operate to lift said frame efficiently without binding or distorting the same. Said spur gears 20 are normally locked against rotation by the worms 25 and worm wheels 21, but may be readily turned as above described to adjust the frame C. A horizontal drive-shaft 29 journaled in bearings 30 on braces 31 joining the channel bars 27, is supplied with a long pulley 32 and a bevel gear wheel 33. A vertical, driven shaft 34, carrying a circular saw-blade 35, at its lower end, is revoluble in bearings 36 attached to braces 37 between the channel bars 27, at one end of the frame. Said vertical shaft is provided at its upper end with a bevel gear 38 in mesh with the bevel gear 33 on the drive-shaft 34 and is secured against vertical movements in its bearings 36 by collars 39. A belt 40 driven by a suitable power device (not shown) passes over the pulley 32 and slides from one end thereof to the other, as the carriage B is shifted backward and forward upon the truck.

A lever 41 for shifting and locking the carriage B is pivoted at one end upon a bracket 42 on the truck A and extends rearwardly across the carriage bars 14. Said lever 41 is formed with a longitudinal slot 43 therein, which slidably receives a pin 44 on a bar 14 of the carriage. Manipulation of this lever shifts the carriage B and moves the saw-supporting frame C longitudinally therewith. A hand-operated yielding lug 45 on the lever 41 is adapted to engage notches 46 of a quadrant 47 on said bracket and secure the lever, thus locking the carriage in place.

The frame C, as above described, permits the adjustment of the saw-blade from the surface of the ground upward to an elevation of two or three feet. It is sometimes desirable, however, that the stump of a tree be five or six feet in height to serve as a fence post or the like. We adapt our saw to be elevated for this purpose by adding U-shaped channel bars 48 identical with said bars 27 and securing the same in upright position on the bars 27, as shown in dotted lines in Figs. 1, 2, and 3. The legs of these bars are provided with racks 49 identical with those of the bars 27 and the frame C is inverted to bring said racks in mesh with the spur gears 20 of the carriage. By thus inverting the frame C it will be seen that the saw is raised a considerable distance and is capable of the same range of adjustment in such elevated position as in the low position first described.

In use the machine is hauled near the tree to be felled and the hand-wheel 23 is turned to raise or lower the frame C and thus procure the desired vertical adjustment of the saw-blade 35. The lever 41 is swung to the right, as seen in Fig. 2, after the dog 45 has been disengaged from the quadrant 47 and such shifting of the lever moves the carriage B and presses the teeth of the saw against the tree. Such pressure of the saw teeth may be varied at the will of the operator to suit conditions during the operation. If a tree is too large to be severed at one cut, the machine may be moved to saw an additional kerf in the trunk, and the saw-blade may be adjusted to proper elevation to meet the first kerf by turning the hand-wheel 23. In moving the machine from place to place the carriage B is secured upon the truck by means of the lever 41 and the saw supporting frame C is secured in position upon said carriage by the frame adjusting mechanism.

Having described our invention, what we claim as new and desire to protect by Letters Patent is:

In a machine for cutting down trees, a truck, a carriage movable horizontally on said truck, transverse shafts revoluble in said carriage, a pair of gear wheels and a worm wheel on each of said shafts, a reversible frame, a power-driven circular saw blade revolubly mounted on one end of said frame, a set of upright racks on opposite sides of the frame, each set of racks being arranged to mesh one at a time with said gear wheels, a worm in mesh with each worm wheel and means for simultaneously turning said worms to raise and lower said frame, said parts being arranged to permit the horizontal cutting movement of the blade a distance substantially equal to its radius.

In testimony whereof, we have signed our names to this specification in the presence of two subscribing witnesses.

LOX CONNER.
WILSON COLBERT.

Witnesses:
L. M. Lyons,
W. H. Rust.